United States Patent [19]

Jacobs

[11] 3,738,702
[45] June 12, 1973

[54] MEANS FOR COOLING AND HEATING A SEAT STRUCTURE

[75] Inventor: James W. Jacobs, Dayton, Ohio
[73] Assignee: General Motors Corporation, Detroit, Mich.
[22] Filed: Mar. 15, 1972
[21] Appl. No.: 234,908

[52] U.S. Cl.............. 297/180, 165/45, 165/105, 5/284, 219/217, 296/63, 126/205, 128/377
[51] Int. Cl............................................. A47c 7/74
[58] Field of Search.................... 165/105, 45; 128/376, 377; 296/63; 297/180; 5/284, 347; 126/205; 219/217

[56] References Cited
UNITED STATES PATENTS
773,828   11/1904   Titus........................................ 5/284
2,722,266 11/1955   Kersten................................. 297/180
3,438,069  4/1969   Long.................................... 5/284 X FOREIGN PATENTS OR APPLICATIONS
556,685   10/1943   Great Britain...................... 219/217
2,011,004  9/1970   Germany............................ 297/180

Primary Examiner—Albert W. Davis, Jr.
Attorney—Frank J. Soucek and Charles R. Engle

[57] ABSTRACT

A seat structure such as a vehicle seat or a portable pad capable of being placed upon a seat structure including a heat pipe assembly having an elevated portion responsive to body heat of an occupant in the area where the body engages the seat or pad thereby heating and cycling a volatile fluid in the heat pipe to the elevated portion which is in thermal communication with the ambient environment for continuously cooling the seat or pad area engaged by the occupant. A selectively energized heater can be disposed within or near the volatile fluid for activating the heat pipe cycle and continuously warming the body engaged surfaces of the seat or pad as desired. The heat pipe can be formed as an integral part of the pad or the seat structure by incorporating a sealed impermeable plastic passage containing the appropriate volatile fluid.

3 Claims, 8 Drawing Figures

PATENTED JUN 12 1973 3,738,702

PATENTED JUN 12 1973 3,738,702
SHEET 2 OF 2
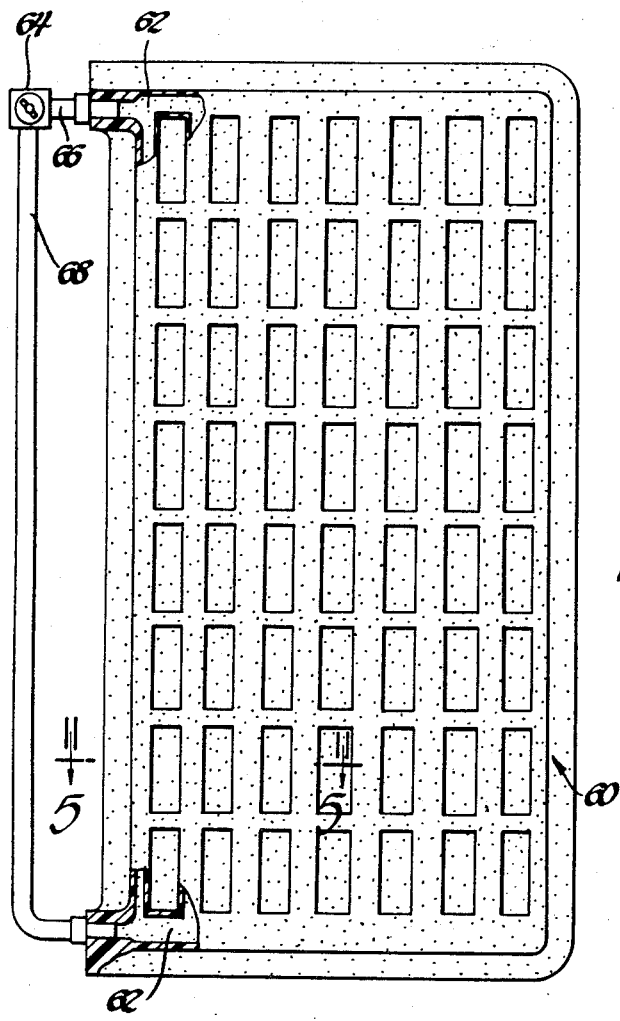
Fig.4
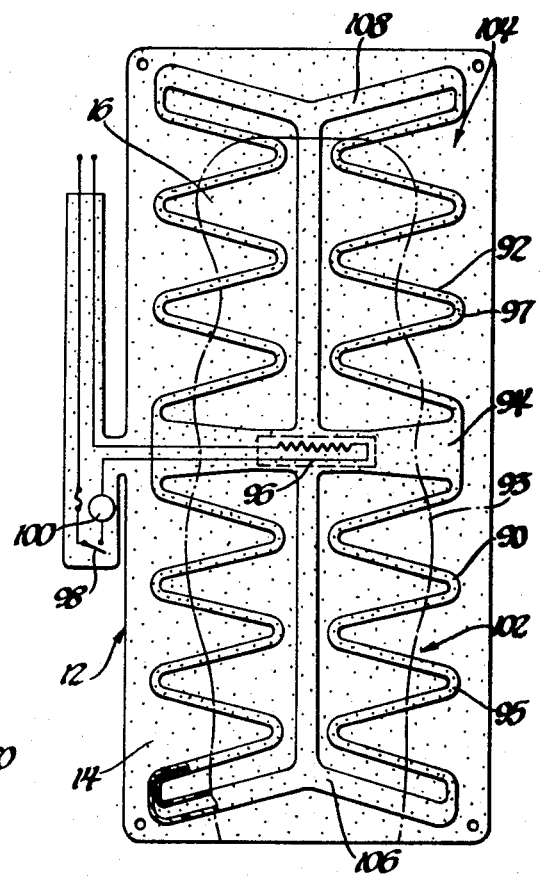
Fig.7
Fig.5
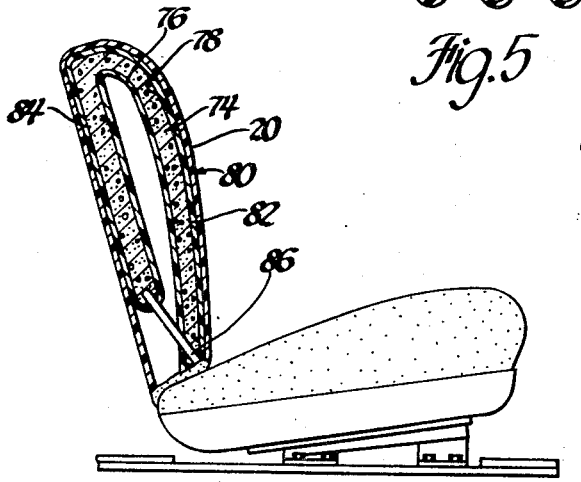
Fig.6
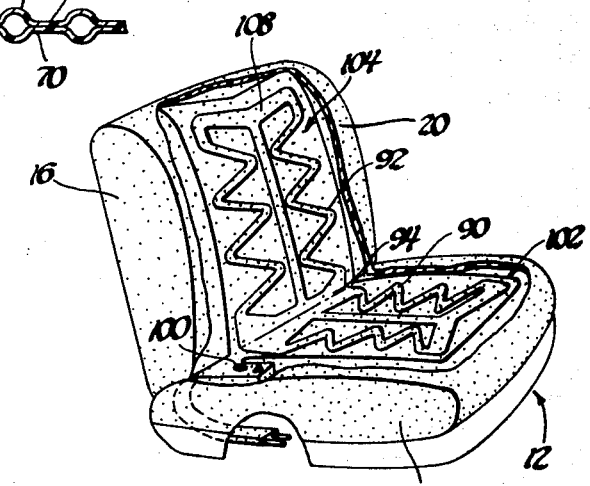
Fig.8

MEANS FOR COOLING AND HEATING A SEAT STRUCTURE

This invention relates to a seat structure incorporating a heat exchange or heat pipe assembly for warming or cooling an occupant as prevailing conditions require. More specifically, this invention relates to such a seat structure wherein the heat pipe is responsive to body heat of an occupant to effect cooling of the occupant and further can include a selectively energized heater for warming the occupant.

Providing adequate cooling or warming of a seat occupant as climate conditions dictate has been the objective of many systems in the past. These systems necessarily involve complex plumbing and control arrangements usually requiring the system to be fixed in place. This invention provides a means for both heating and cooling a seat structure wherein the means can be portable or it can be incorporated in a seat structure without necessitating significant installation requirements. Since the means accomplishing the heating and cooling is a heat exchange or heat pipe assembly it is only necessary that the heat pipe be disposed adjacent surfaces engaged by a body occupying the seat and that the closed container of the heat pipe include a condenser end elevated relative to a heat sensing boiler end. Heat generated by a body occupying the seat structure creates a temperature differential between the boiler end and the condenser end of the heat pipe assembly, the heat being effective to vaporize a volatile fluid in the heat pipe at the boiler end causing the vapors to rise to the condenser end and condense to a liquid which flows back to the boiler through either capillary action, by gravity or by a combination of both. The condensing of the vapors at the condenser end results in a discharge of heat in an area of the seat not engaged by the occupant by virtue of the seat portion containing the condenser being in thermal communication with the ambient environment. The removal of heat at the condenser provides a cooling effect at the boiler end where the occupant engages the seat.

Means for providing warming of the occupant can readily be incorporated in this arrangement by merely providing, for example, a cartridge type electric heater within or in the vicinity of the boiler end of the integral heat pipe assembly. The electrical heater can be connected in circuit with the vehicle power source such that the operator can regulate the supply of current to the heater vaporizing the volatile fluid and initiating the continuous vaporizing-condensing cycle in the heat pipe assembly warming the occupant. If it is desired that the seat should only include means for cooling the occupant or if it is provided with a plug-in electrical connection the assembly obviously can in either situation be entirely portable.

The heat pipe assembly can be a separate sealed container filled with a volatile fluid such as trichloromonofluoromethane, commonly referred to as R11 Freon. Of course, any volatile fluid that is readily capable of being vaporized in response to a slight temperature differential between the boiler end and the condenser end of the heat pipe would also be readily effective. In the situation where the seat is of the type including a nonpermeable plastic cover material over a plastic cushioning foam such as open-cell polyurethane, then passages adjacent the portions engaged by an occupant could be heat or otherwise sealed in the cover material retaining the volatile fluid in the areas so engaged. Another method of obtaining the same result is by providing passages in the cushioning foam so that fluid flow is adjacent surfaces engaged by the occupant. Since it is common practice to provide a slight elevation from one edge of a seat portion toward another portion either in a seat bottom or back, such elevation is sufficient to render the integral heat pipe assembly operative in response to heat supplied either by the body engaging the boiler end or by energization of the aforementioned electric cartridge type heater.

It is, therefore, a general object of the present invention to provide a heat exchange or heat pipe assembly in association with a seat pad or seat structure effective to cool portions of the seat engaged by an occupant.

A more particular object of the present invention is to provide a heat pipe assembly in a seat pad or seat structure integral with the pad or structure by sealing passages in a plastic cover material in areas of the seat engaged by an occupant, the assembly not requiring utilization of additional components.

A further object of this invention is the provision of a heat pipe assembly formed by sealing impermeable plastic seat covering materials into a closed container filled with a porous plastic cushioning foam wherein the container is filled with a volatile fluid and is responsive to heat generated by the body of an occupant so that the fluid is vaporized and rises through the foam to an elevated end where it discharges heat and condenses to a liquid and returns through the foam to the heat receiving end thereby continuously cooling the portions of an occupant engaging the seat structure.

Another object of the present invention is to provide a heat exchange or a heat pipe assembly in a seat pad or seat structure wherein the heat pipe comprises an elongated closed container having a lower boiler end and an upper condenser end, the lower boiler end having an electric heater disposed adjacent thereto or therein for heating the volatile fluid in said container to a temperature above body heat and vaporizing it so that the vapors rise toward the condenser end condensing into a liquid discharging heat, the liquid returning to the boiler providing a continuous cycle heating the occupant while the heater is energized.

The novel features which I believe to be characteristic of my invention are set forth with particularity in the appended claims. My invention itself, however, both as to its organization and method of operation, together with further objects and advantages thereof, will be best understood by reference to the following description taken in conjunction with the accompanying drawings in which:

FIG. 4 is a top plan view of a vehicle seat with portions broken away illustrating fluid passages therein.

FIG. 5 is an enlarged fragmentary view of a portion of FIG. 4 taken on line 5—5.

FIG. 6 is a side elevational view of a vehicle seat with a portion of the seat back broken away to illustrate a further modification of the subject invention.

FIG. 7 is a top plan view of a seat structure employing passages for heating or cooling both the seat back and the seat bottom in accordance with the subject invention.

FIG. 8 is a perspective view of the seat assembly shown in FIG. 7 with a portion broken away illustrating provision of an electrical connection to a heater that is connected to the vehicle electrical system.

Figure 1:
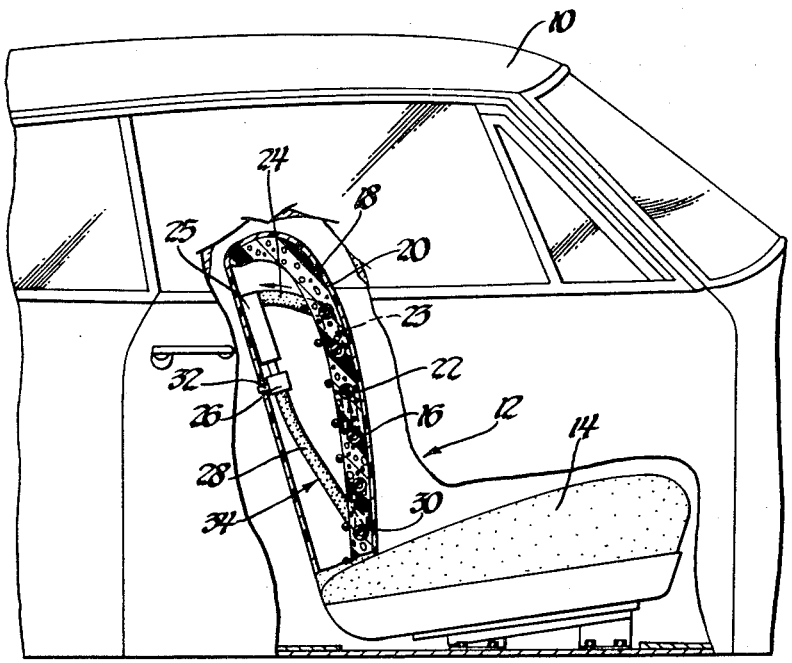
FIG. 1 is a fragmentary side elevational view with portions broken away illustrating a vehicle seat employing a heat exchange assembly in accordance with the concept of this invention.

With reference to FIG. 1, a vehicle 10 is illustrated including a seat assembly 12 comprising a seat bottom 14 and a seat back 16. The seat back 16 contains foam cushioning material 18 covered by plastic material such as an impermeable vinyl cover 20, the foam cushioning material 18 containing a conduit 22 that follows a serpentine upwardly directed path through the foam material 18 adjacent the cover 20. The conduit 22 is connected to a slightly upwardly extending pipe 24 that is connected to a condenser assembly 25 which also has a return pipe 28 connected thereto. The upper portions 23 of conduit 22 connect with the pipe 24 that is connected to the condenser assembly 25 for a purpose later described. The return pipe 28 connects with a lower boiler portion 30 of the serpentine passage 22 completing a closed fluid circuit. A recharging valve 26 in the return pipe 28 contains a closed pipe fitting 32 through which the closed fluid circuit can be filled with a volatile fluid such as trichloromonofluoromethane, commonly referenced as R11 Freon. The filling of the closed fluid circuit with the volatile fluid completes a heat pipe assembly 34 including the condenser 25 and boiler 30 in the closed fluid circuit. The volatile fluid is responsive to slight temperature differentials between the boiler end 30 of the heat pipe assembly 34 and the upper condenser 25 and as long as the temperature at the boiler 30 is slightly greater than that of condenser 25, the assembly functions to vaporize the fluid at the boiler and discharge heat by condensing the vapors at the condenser providing a continuous operational cycle. In fact, a temperature differential extending between the boiler 30 of the heat pipe assembly 34 and the condenser end 25 of less than 1° F. is sufficient for the volatile fluid to be vaporized at the boiler end 30 causing it to rise as a vapor through the upper portion 23 of the serpentine passage 22 and flow through passage 24 to the condenser 25 where the vapors discharge heat and condense return flowing as a fluid by gravity through the recharging valve 26 and passage 28 to the boiler 30. The positioning of the serpentine passage 22 adjacent the cover material 20 renders the volatile fluid responsive to body heat supplied at the boiler 30. When the seat is occupied, the volatile fluid is vaporized and rises through the serpentine passage 22 and the pipe 24 to the condenser 25 where it discharges heat and condenses before flowing by gravity downwardly through passage 28 back to the boiler 30 for reheating and revaporization providing a continuous cooling effect while the seat is occupied.

Figure 2:
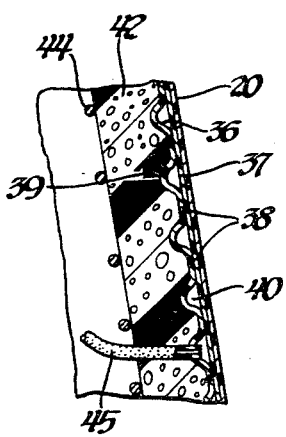
FIG. 2 is an enlarged fragmentary view of a modified portion of the seat back illustrated in FIG. 1.

With reference to FIG. 2 a modified form of the serpentine passage 22 is illustrated wherein an impermeable formed plastic portion 36 is heat or otherwise sealed to an impermeable plastic face 37 at a plurality of points 38 forming an assembly 39 having a sinuous passage 40 similar to that provided by the serpentine passage 22 of FIG. 1. The impermeable plastic assembly 39 is positioned between a polyurethane foam cushion 42 which is retained by a spring assembly 44 and the adjacent seat cover 20. The passage 40 is also filled with a volatile fluid which responds to heat supplied by the body of an occupant causing the fluid to vaporize and transverse the sinuous passage to the upper portions of the seat back assembly where the vapors flow to the condenser, condense and return flow as a liquid through a conduit 45 to the lower boiler end of the sinuous passage 40 in the same manner as described with reference to FIG. 1.

Figure 3:
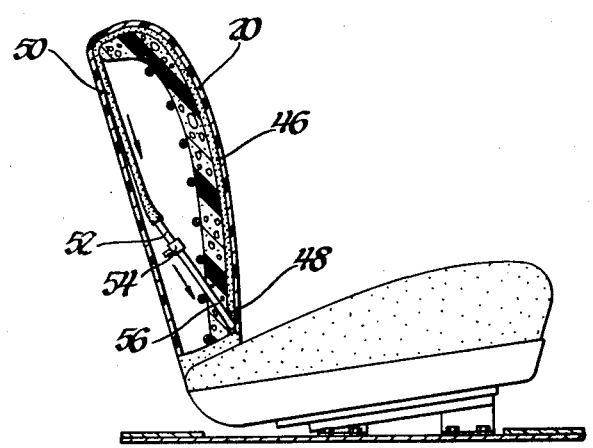
FIG. 3 is a side elevational view of a vehicle seat with portions broken away illustrating another modification of the subject invention.

A further modification of the subject invention is shown in FIG. 3, wherein a fluid passage 46 is provided adjacent the cover material 20 and is likewise filled with a volatile fluid. The volatile fluid is heated at the boiler end 48 and rises through the passage 46 as a vapor and is condensed at the condenser 50 of a heat pipe assembly. The liquid condensed from the vapors at the condenser 50 flow through a conduit 52 through a shut off valve 54 from which the liquid flows through conduit 56 to the boiler 48. The shut off valve 54 is operative to discontinue cyclic operation of the heat pipe assembly and is utilized to charge the system with the volatile fluid as required. Of course, such a shut off valve can be provided in any of the embodiments of this invention giving the seat occupant the option of discontinuing cyclic operation of the heat pipe assembly as he desires.

FIG. 4 illustrates a unit 60 for cooling a seat assembly including a lattice network of passages 62 adapted to be placed adjacent the cover of seat 12. The passages 62 connect with a shut off valve 64 through a conduit 66, the shut off valve controlling flow through another conduit 68 providing for circulation of a volatile fluid in a closed circuit. The closed circuit of this likewise comprises a heat pipe assembly wherein a slight temperature differential between a boiler input portion of the assembly and an elevated condenser portion of the assembly results in a continuous cyclic operation of the fluid. The specific configuration of the passages 62, forming the lattice network of FIG. 4, is more specifically shown in FIG. 5 wherein the passages 62 are illustrated as being formed by heat sealing or otherwise securing impermeable plastic sheets 69 and 70 at a plurality of points 72.

A further modification of the invention is shown in FIG. 6, wherein a sealed container 74 is formed between an inner wall of impermeable plastic material 76 and an outer wall of like material, the walls cooperating to define an arcuate chamber 78 in the form of a seat back 80. Prior to being tightly sealed, the chamber 78 is filled with both an open-cell foam 82, such as that obtained from polyurethane, and a volatile fluid forming a heat pipe assembly. As a heat pipe assembly, the sealed container 74 includes a condenser portion 84 and a boiler portion 86 wherein the volatile fluid is heated electrically or in response to body heat and cyclically circulates through the open cell foam as previously described.

FIG. 7 illustrates a further modification of the subject invention wherein both the seat bottom 14 and the seat back 16 include sinuous passages 90 and 92, respectively. The passages 90 and 92 connect with a common boiler cavity 94 which contains a cartridge type electric heater 96 capable of dissipating up to 360 watts of electrical energy. The heater is connected to an electrical power source in the vehicle, not shown, and is controlled through a switch 98 and a thermostat 100. The passages 90 and 92 cooperate with the boiler cavity 94 to form respective heat pipe assemblies 102 and 104, the respective assemblies including condenser portions 106 and 108 which are elevated relative to the boiler cavity 94. The heat pipe assemblies 102 and 104 contain a volatile fluid, such as the aforementioned trichloromonofluoromethane thereby providing an assembly operative for both cooling and warming an occupant of the seat assembly 12. During warm weather conditions the switch 98 is retained in an open position and the boiler cavity 94 is responsive to the heat supplied by the body of an occupant to vaporize the volatile fluid causing it to rise through the passages 90 and 92 toward the respective condensers 106 and 108.

The area of contact of the seat occupant with the seat bottom 14 and seat back 16 including portions of the heat pipe assemblies 102 and 104 is generally within the area defined by broken line 93. Since the area defined by line 93 is not subject to being cooled by air flowing within a car body, the temperature within the area will be warmer than ambient air and this heat will vaporize the volatile fluid. The vapor will rise until it comes into contact with a cooler surface, such as at the condenser portions 106 and 108, or even portions of passages 90 and 92 as indicated at 95 and 97 respectively which are outside the area of line 93. Here the volatile fluid will condense and give up its latent heat of condensation, which is dissipated to the ambient air within the car interior. Regardless of the place of condensation, the condensed fluid will return by gravity to the boiler cavity 94. The result is a cooling of the occupant area 93 during warm weather conditions. The amount of cooling achieved relates to the temperature differential between the area 93 and the ambient air impinging upon condenser portions 106 and 108 or portions 95 and 97, such that the temperature within area 93 approaches within a few degrees the ambient air temperature.

In an air conditioned car which is usually 70° to 80° F. in cold weather conditions, switch 98 is closed energizing cartridge heater 96, adding heat to the volatile fluid and vaporizing it for transmission toward condensers 106 and 108. Since the passages 90 and 92 will be initially colder than the heater 96, the vaporized fluid will condense in the passages 90 and 92, giving up its latent heat of condensation and heating the passages. This process will continue until the condensation eventually takes place in the condenser portions 106 and 108. Thus the volatile fluid provides a ready means for transporting heat from the heater 96 and distributing it throughout portions 102 and 104 heating the occupant's body within the area defined by line 93. During the heating cycle, the condensed fluid will return by gravity to the boiler cavity 94 for reheating by the cartridge heater 96. By virtue of the energization of cartridge heater 96, the occupant of the seat is continuously warmed as long as switch 98 and thermostat 100 are closed. The thermostat 100 is provided in the circuit so that the occupant can adjust the rate of cycling of the fluid by the heater 96 thereby thereby regulating the amount of heat emitted by the heat pipe assemblies 102 and 104. A rheostat type control could be utilized in place of thermostat 100 to regulate the amount of heat generated by the heater 96 by regulating the flow of current therethrough.

A significant feature of this invention resides in the fact that by virtue of a closed container assembly either provided in a seat pad or as an integral part of a vehicle seat assembly, the heat pipe assembly provided thereby is responsive to the heating of the seat as a result of the vehicle being parked in a sunlit area and should the upper portions of the seat be shaded, the assembly automatically operates to cool the seat prior to being engaged by an occupant. It is apparent from the above description that a closed container filled with a volatile fluid having an elevated portion can readily be provided in any type of seat structure to accomplish the aforementioned desired results.

While I have shown for purposes of illustration specific forms of the closed container heat pipe assembly constructed in accordance with the present invention in vehicle seat structures, it will be understood that numerous variations and alternative constructions may be made without departing from the true spirit and scope thereof. While the subject invention has been shown in specific combination with a vehicle seat structure, I do not intend to limit my invention thereto except as required by the following appended claims.

I claim:

1. A seat structure including a body support having a portion elevated in relation to other portions, means defining a chamber therein extending to said elevated portion and said other portions and being in thermal communication with the ambient environment in said elevated portion and with the body of an occupant in the seat structure in a portion of said other portions, said chamber containing a fluid having a boiling temperature below the temperature of said other portions when the seat is occupied and above ambient temperature whereby boiling vapors rise in said chamber to said elevated portion where they condense into a liquid and return flow to said other portions for reheating by the body of the occupant, the heating of said other portions and the cooling at said elevated portion being continuously effective to remove heat added to the fluid as long as a temperature differential exists between said other portions and said elevated portion thereby continuously cooling the occupant.

2. A seat structure including a body support having a portion elevated in relation to other portions, a heat transfer unit therein extending to said elevated portion and said other portions in a sinuous path and being in thermal communication with the ambient environment at said elevated portion and with the body of an occupant in the seat structure in a portion of said other portions, said heat transfer unit containing a fluid having a boiling temperature below the temperature of said other portions when an occupant of the seat supplies heat thereto and above ambient temperature, and a selectively energized heater adjacent said other portions whereby heat supplied by an occupant and heat supplied by said heater when energized boils the fluid generating vapors rising to said elevated portion where they discharge heat and condense into a liquid return flowing to said other portions for reheating, the boiling of the fluid by heat of the body of an occupant cooling the occupant by virtue of heat removed at said elevated portion and the boiling of the fluid by heat added by said heater warming the occupant as the fluid temperature increases above body temperature.

3. A seat structure composed of plastic materials including a body support having a portion elevated in relation to other portions, a heat pipe assembly within said support adjacent body engaged surfaces, said heat pipe including a sinuous passage formed between sealed plastic members of said seat structure, said heat pipe including a condenser in thermal communication with the ambient environment at said elevated portion and a boiler in thermal communication with an occupant at a portion of said other portions, a return passage in said seat structure connecting said condenser with said boiler, a selectively energized electric heater also in thermal communication with said boiler, said heat pipe containing a fluid having a boiling temperature below the temperature of said other portions when an occupant of the seat supplies heat and above ambient temperature, heat supplied by said heater and an occupant of said seat boiling the fluid generating vapors rising to said condenser where they discharge heat to the ambient environment and condense into a liquid return flowing to the boiler for reheating, the boiling of the fluid by heat of the body of an occupant cooling the occupant by virtue of heat being removed at said condenser, the selective boiling of the fluid by said heater warming the occupant as the fluid temperature increases above body temperature, and a shut off valve in said return passage operable to discontinue cyclic operation of the heat pipe assembly at the option of an occupant.

* * * * *